United States Patent [19]

Kurywczak

[11] Patent Number: 4,641,552
[45] Date of Patent: Feb. 10, 1987

[54] RINGGEARLESS TWIN SUN PLANETARY POWER AMPLIFIER

[76] Inventor: Eugene Kurywczak, 238 Murray St., Elizabeth, N.J. 07202

[21] Appl. No.: 581,620

[22] Filed: Jan. 22, 1985

Related U.S. Application Data

[63] Continuation-in-part of Ser. No. 257,323, Apr. 22, 1981, abandoned.

[51] Int. Cl.[4] ............................ F16H 1/28; F16H 3/44
[52] U.S. Cl. .................................... 74/802; 74/777
[58] Field of Search ............ 74/802, 799, 773, 781 R, 74/777

[56] References Cited

U.S. PATENT DOCUMENTS

| | | |
|---|---|---|
| 1,992,333 | 2/1935 | Stelzer .................................. 74/802 |
| 2,794,350 | 6/1957 | Hart ...................................... 74/802 |
| 3,156,136 | 11/1964 | Sogabe .................................. 74/802 |
| 4,189,962 | 2/1980 | Chung .................................. 74/802 |
| 4,358,968 | 11/1982 | Miller ............................... 74/777 X |

FOREIGN PATENT DOCUMENTS

| | | | |
|---|---|---|---|
| 168793 | 8/1951 | Austria ................................. 74/802 |
| 584484 | 7/1930 | Fed. Rep. of Germany ........ 74/802 |
| 591142 | 1/1934 | Fed. Rep. of Germany ........ 74/802 |
| 1091658 | 4/1955 | Fed. Rep. of Germany ........ 74/802 |
| 1191656 | 4/1965 | Fed. Rep. of Germany ........ 74/802 |
| 2713264 | 9/1977 | Fed. Rep. of Germany ........ 74/802 |
| 729244 | 7/1932 | France ................................. 74/773 |
| 1351849 | 12/1963 | France ................................. 74/802 |
| 1356792 | 2/1964 | France ................................. 74/802 |
| 647576 | 10/1962 | Italy .................................... 74/802 |
| 169759 | 9/1934 | Switzerland ......................... 74/802 |
| 633056 | 12/1949 | United Kingdom ................ 74/802 |
| 1000539 | 1/1964 | United Kingdom ................ 74/802 |
| 1431335 | 4/1976 | United Kingdom ................ 74/802 |

OTHER PUBLICATIONS

Product Engineering–Feb. 1956, p. 225.

Primary Examiner—Leslie Braun
Assistant Examiner—Dirk Wright

[57] ABSTRACT

A planetary transmission incorporates two sun gears, one of which is braked, a planet carrier and two planet gears. Input power is supplied to one of the sun gears and output power is fed to an output shaft from the planet carrier.

3 Claims, 6 Drawing Figures

RINGGEARLESS TWIN SUN PLANETARY POWER AMPLIFIER

This is a continuation-in-part of application Ser. No. 257,323, filed 4-22-81 now abandoned.

The invention relates to power amplification in a planetary system arrangement, while transmitting the power to the load from rotary power sources, by the arrangement of its members. The arrangement utilizes at least two stages of amplification of force, one of which is not part of the reducticn ratio. Attributable to translation of linear motion of the planet and the idle device by the carrier.

Presently various types of planetary arrangements are used to amplify torque or velocity. Employing the mechanical advantage of gears, sprockets and pulleys used as machines, also the flexibility and resistance of chains, pulleys and rigidity of shafts (axles) for transmission between the machines. This is illustrated by U.S. Pat. No. 633,056 and in McGraw-Hill publication "Gear Design and Application" by Nicholas P. Chironis chapter 3 p ages 94–103. In McGraw-Hill publication, on page 95 example 1, on page 96 example 2, are shown simple planetaries with reduction equations and tables of relationship of torque to angular speed, also on page 96 example 4, on page 97 example 5, are shown same analysis for compound planetaries, such as shown in German Pat. No. to Lucas Ser. No. 2713264. On page 101 example 22 shows all combinations of application and comparison of these planetaries. Since gears on pivots are like a lever on a fulcrum, the law of mechanical advantage can be applied to analyze the force transmitted from gear to gear to the carrier, that can be also be treated as a lever.

The mechanical advantage is: length of the effort arm to the fulcrum divided by the length of the load arm to the fulcrum. Applying this law to analyze example 22 on page 101 of McGraw-Hill. Simple planetary first. Lets assume a size of 1 for gears 1 and 3, gear 2 has to be size 3 and let gear 2 be braked. Applying force of magnitude 1 from gear 1 to gear 3, it is evident that at the load arm, center of gear 3 and connection with the carrier is $\frac{1}{2}$. Therefore M.A. or R is 2. The length of the carrier is also 2 times greater than gear 1 therefore R is 2 again, therefore total R is 4. Compound planetary (inversion). Since one size gears can not be used, it would apply force at the fulcrum. Assume size 1 for gears 1 and 4 and size 2 for gears 2 and 3. Let gear 3 be braked. Gear 3 became the fulcrum for lever comprising of gears 2 and 4. Gear 2 being 2 times that of gear 1 put the carrier equal distance from the fulcrum with gear 1. Applying force to gear 2 by gear 1 did not amplify the force and force of 1 is applied to the carrier. The length of the carrier to fulcrum is the sum of gears 1 and 2 therefore 3, therefore overall R is 3.

My observation is: the simple planetary is restricted by the ringgear and the inward position of the planets that shortens the carrier. The advantage is the dual force amplification by the planet and by the carrier. The compound planetary is restricted by selection of ratios of gears, loss of or comparatively low amplification of force by the planet. The advantage is the great length of the carrier extending over the braked reaction gear giving large amplification of force. Both types of this planetaries are basically 3 levers: 1 - input gear on the shafts, 2 - planet on the reaction gear and 3 - the carrier on its pivoting point. However the planet gears are levers whose angular displacement is diverted into linear displacement and since the carrier is driven by center of planet gears, its angular displacement is the equivelant of the planets linear displacement. The law for rotating rigid body states: different points on a rigid body have the same angular: displacement, speed, acceleration at any instant, do not have same linear: displacement, acceleration or speed. Since we know the mechanical advantage R, angular speed is 1/R, we can determine the linear displacement of the palnet on the reaction gear and the planets center, that moves the carrier. Assume 1 ft. for circumference of smallest gear. For simple planetary gear 1 and 3=1 ft., gear 2=3 ft., R=4 therefore angular speed=$\frac{1}{4}$. Force applied to the circumference of the planet. Then for 1 revolution of gear 1 or 1 ft. displacement of the point of application of force, gear 3 will travel of distance $\frac{1}{4}$ of 3 ft. over the surface of gear 2=$\frac{3}{4}$ ft. on the reaction gear. While the center of gear 3 and the carrier is moved, being size 2, $\frac{1}{4}$ of 2 ft. or $\frac{1}{2}$ ft. of linear displacement. The compound planetary. Assumed sizes are 1 for gear 1 and 4 and size 2 for gears 2 and 3, the carrier is size 3. The circumference 1 ft. for gears 2 and 3, 2 ft. for 3 and 4 and 3 ft. for the carrier. R=3, angular speed $\frac{1}{3}$, one revolution of gear 1=1 ft. displacement of applied force. Gear 4 will be displaced $\frac{1}{3}$ of the circumference of gear 3, $\frac{1}{3}$ of 2 ft., $\frac{2}{3}$ ft., while the center of gear 4 and the carrier are displaced $\frac{1}{3}$ of 3 ft. or 1 ft. Comparing these displacements to rectilinear motion, the planet and its center would be displaced 1 ft. The planet in its center in a simple planetary system would be displaced $\frac{1}{2}$ ft. In accordance with moment around the fulcrum. From this we can see that in a translated linear motion, a planet rolling on a pure circular surface can gain or lose linear displacement over the surface, depending on its position on the radius of the translating device (carrier) toward its center. Since the transfer of power in these systems depends on Newtons 3 rd Law that states "For every action there is an equal and opposed reaction and Newtons 2nd Law" force equals mass x acceleration, momentum taking place in the direction of the applied force. It is evident that other forces are present in the systems, imposed by the translator on the planet. In an angular displacement, the plane converges toward the center and diverges away from the center. Therefore the distance along the radius increases and decreases while the force is inversely proportional. Since the input gear is on the axis of the carrier, in the transfer of linear displacement of the planet some linear displacement is lost on the reaction gear due to the convergence in the compound planetary system in respect to rectilinear surface. Therefore a nonconservative force is acting on the planet. In the simple planetary system, the planets mechnical advantage ratio is 2. Therefore on a rectilinear reaction surface a force applied for a distance equal to planets circumference at the circumference, the planet is displaced $\frac{1}{2}$ of its circumference. The reaction gear is 3 times that of the planet and input gear therefore a reduction of 6. But the systems reduction is 4, an increase of displacement of distance by 1 and $\frac{1}{2}$ is realized due to the translation imposed on the planet, rolling it in a diverged position of the carrier radius over the reaction gear. Since the force is developed between the reaction gear and the applied point on the circumference of the planet, power for that displacement is $\frac{3}{4}$ ft. times force 2 equals 1 and $\frac{1}{2}$ times the input, potentially available due to translation. Which of course is in conflict with the 1st law of thermodynamics, but is in perfect compliance with the law of potential energy, that states: potential energy, is energy possessed by a body due to its position and state. Since it was not tapped it never was scrutinized. Both systems apply force to the carrier developed at the center of the planet by the angular displacement of pure rotation of the movement around the fulcrum, diverted into translated linear displacement around the (fulcrum) reaction gear. The amount of linear displacement of the carrier, is the result of how much the planet center will increase or reduce the radius of carrier by its position on the reaction gear. In the simple planetary system: linear displacement due to R, $=\frac{3}{4}$ ft. along the reaction gear. Carrier is reduced by center of the planet $\frac{1}{3}$, displacement of carrier $\frac{1}{2}$ ft. Loss of $\frac{1}{4}$ ft. In the compound planetary: linear displacement due to R, $=\frac{2}{3}$ ft. along the reaction gear, carrier is increased by the center of the planet $\frac{1}{3}$. Displacement of carrier 1 ft. A gain of $\frac{1}{3}$ ft. In both systems the translated linear displacement at the reaction gear is brought into equivalency of the angular displacement by the center of the planet and applied to the carrier and in to 1 to 1 power ratio.

The arrangement that I shall present, is similar to the simple planetary system, that the load is between the circumference and the reaction gear on the planet. It is similar to compound planetary system that has dual gear planet, the input sun and the braked sun are in the center. It is different from the simple planetary, that it does not have a ringgear. It is different from the compound, that the planet is a class 2 type lever, compound uses class 1 or 3. Allows the use of 1 to 1 ratio gears. It is different from both, that it utilizes one more machine (lever) between the input sun and the planet. This additional lever changes the performance to a degree that the carrier angular speed reduction ratio is not the mechanical advantage ratio. This puts the system as a whole in conflict with the 1st law of thermodynamics. But it is compliance with the law of potential energy. And each machine in the system individually, is in compliance with all the laws applicable to it as in the old art. These reasons are the object of petition for a patent by the applicant. Detailed description will clarify the operation of the system, from which it will be evident that the system amplifies power.

DRAWINGS

FIG. 1 shows an arrangement incorporating bevel gears as in photo Exp. 2.

FIG. 2 shows the engagement of members and their relative position to each other in an arrangement using gears equal size. Sim. as in photo Exp. 1. As seen from top.

Figure 4:
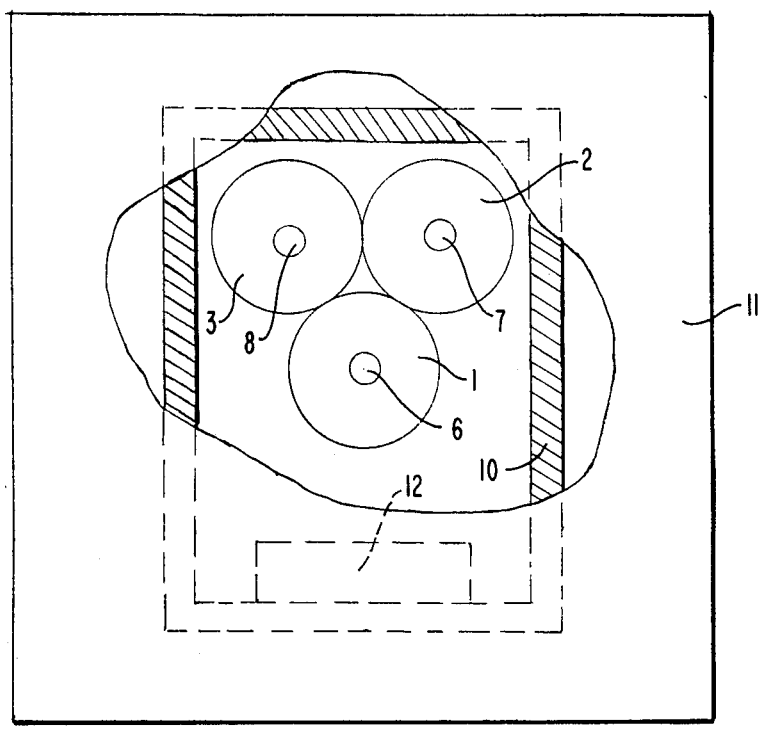
FIG. 4 shows front view of FIG. 5.
Figure 5:
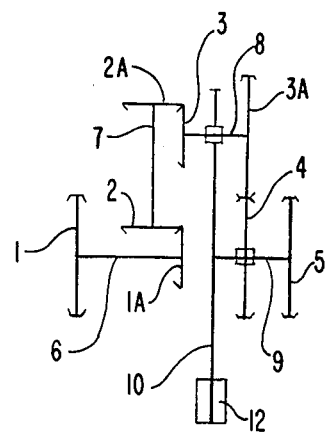

FIG. 5 schematic of FIG. 4 and photo Exp. 2.

Figure 6:
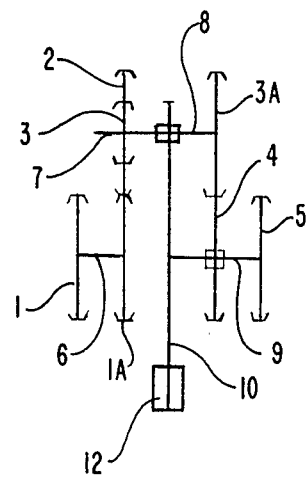

FIG. 6 schematic of photo Exp. 3.

IN THE DRAWINGS

Figure 2:
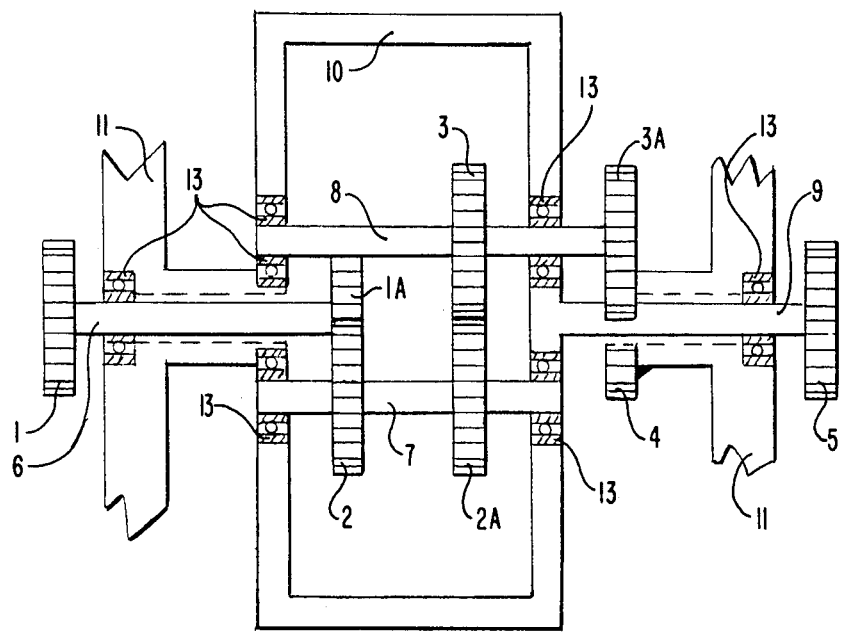
Figure 3:
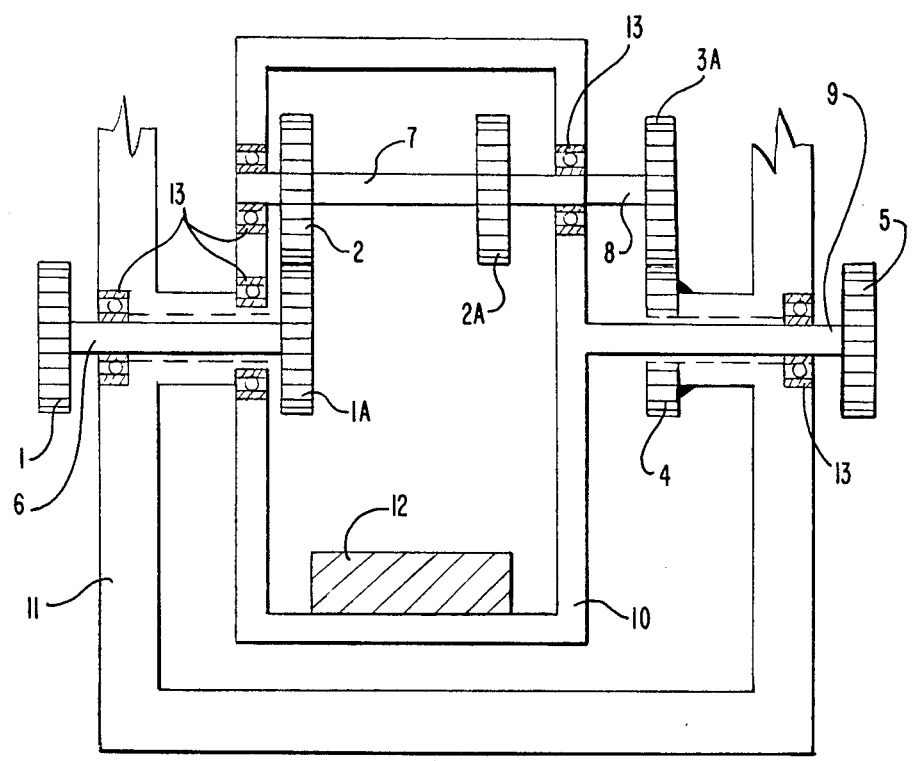
FIG. 3 shows side view of FIG. 5.

FIG. 3 Shows: Partially, a (container) housing 11 to which carrier 10 is rotatably mounted on the input and output walls, by bearings 13, carrier 10 being 2 plates bonded to work as one with carrier shaft 9 centrally bonded to the output plate. To the output wall of housing 11, centrally located, the stationary sun gear 4 is nonrotatably secured. Both, have an opening to allow carrier shaft 9 to pass and protrude out where the output gear 5 is nonrotatably secured to it. The input wall of housing 11 also has an opening centrally located where input axle 6 is rotatably mounted by bearing 13 and passes through proturding on either side, to which input gear 1 and driving input sun 1A is nonrotatably secured and is axially on the axis of carrier shaft 9. See FIG. 2, planet axle 8 and idler axle 7 are rotatably mounted, by bearings 13, to carrier 10. Nonrotatably secrued, to axle 8 are, driven planet gear 3 and driving planet gear 3A and to axle 7 are, driven idler gear 2 and driving idler gear 2A engaging gear 3, see FIG. 3, gear 2 is engaging gear 1A and gear 3A is engaging gear 4. To balance the carrier 10 rotatably, because 1 set of planet and idler component is used, a balancing mass 12 is secured to the carrier 10, 180° opposite the planet and idler components.

Basically, the arrangement is four (4) basic machines, gears used as continuous levers. See FIGS. 1 and 2.

1. Gears 1 and 1A on axle 6, fulcrum bearing 13 of axle 6 mounted in housing 11. Is class one (1) load over the fulcrum. Load, gear 1A engaging effort of machine two (2). See FIGS. 2 and 3.
2. Gears 2 and 2A on axle 7, fulcrum bearing 13 of axle 7 mounted in carrier 10. Is class one. Load, gear 2A is engaging effort of machine three (3).
3. Gears 3 and 3A on axle 8, fulcrum gear 4. Is class two (2), (load between the effort and the fulcrum), load axle 8 mounted in the carrier 10 by bearing 13 of axle 8 is engaging effort of machine four (4), carrier 10. See FIGS. 1 and 2.
4. Carrier 10 and gear 5 on shaft 9, fulcrum bearing 13 of shaft 9.

This arrangement will produce positive rotation of gear 5 for a rotation of gear 1 when power is applied to gear 1. Power applied to gear 1 P1 of 1 ftlb/sec. At angular velocity V1 and linear velocity of 1 ft/sec. and angular torque T1 at 1 lb force, the components of power are transmitted and amplified at this relationship thru the arrangement to one another.

See FIGS. 1, 2, 3 and 4. When gear 1 rotates, gear 1A rotates gear 2, gear 2A rolls gear 3 and 3A on the reaction gear 4, axle 8 the load, pulls the carrier 10 causing it to: rotate, maintain translation of gears 3 and 3A around gear 4 and carry gears 2 and 2A on axle 7. As a result a reduction of angular speed of gear 2 to angular speed of gear 1 takes place, because carrier 10 rotates in the direction of rotation of gear 1A, increasing the time period of engagement with gear 2 and adding to the total reduction of angular speed of carrier 10. (Were the rotation of carrier 10 negative it would subtract.) For one (1) revolution of carrier 10. Gear 1A must revolve for as many revolutions as is predeterment by the product of ratios of: gear 2 to gear 1A, gear 3 to gear 2A, gear 4 to gear 3A plus one 1 revolution of carrier 10. Or, for one (1) revolution of gear 1A carrier 10 will be angularly displaced $$\frac{1 \text{ Rev. of } G1A}{\left[1 + \left(\frac{G2}{G1A} \times \frac{G3}{G2A} \times \frac{G4}{G3A}\right)\right]} = \text{Revolution of Carrier 10}$$

Since, the angular displacement of carrier 10 is also the linear displacement of planet gears 3, 3A on axle 8 around the reaction gear 4. In the system as shown by FIGS. 2, 3 and 4, where the gears are same size, the gear ratio is one (1), therefore the angular reduction is $\frac{1}{2}$. That means that planet gears 3, 3A have rolled $\frac{1}{2}$ the circumference of gear 4. Gear 4 circumference = 1 ft. displacement of gears 3, 3A = $\frac{1}{2}$ ft. over gear 4 for the same angular displacement of carrier 10. Carrier 10 linear displacement at axle 8 is 1 ft, having the radius from shaft 9 equaling the sum of radii of G4 and gear 3A. Therefore the linear displacement of gear 1A and carrier 10 at axle 8 are equal. 1 ft. each.

The torque is transmitted in ratio of the effort radius to the load radius from the fulcrum. Since the system has two (2) elements on each axle and shaft, a driven and a driving. The ratio between the two (2) is the torque for that particular machine applied to the second.

For torque T1 at 1 lb assumed at the teeth of gear 1A, torque at gear 2A is in ratio of gear 2 to gear 2A in respect to axle 7 applied to gear 3 by gear 2A, gears 3, 3A fulcrum is gear 4, the load is axle 8. Therefore the torque at axle 8 is the ratio of the radius of effort, radii of gears 3 plus 3A to axle 8, to the radius of gear 3A to axle 8 applied to the carrier 10 from shaft 9, radii of gears 4 plus 3A, to the radius of gear 5 from shaft 9. Clarifying the above, torque at gear 5 equals $$G1A \ T1 \times \frac{G2}{G2A} \times \left(\frac{G3 + G3A}{G3A}\right) \times \left(\frac{G3A + G4}{G5}\right)$$

Therefore
torque at axle 8, 1 lb×2=2 lb
torque at gear 5, 2 lb×2=4 lb

Power amplification is realized by the arrangement because of the incorporation of the idler machine, gears 2 and 2A on axle 7 which has produced the following:

1. Placed the load, axle 8, of planet gears 3, 3A in position between the applied force by gear 2A to gear 3 and the small braked sun gear 4 on which gear 3A reacts and amplifies that force in ratio of the length of the effort radius to the length of the load radius.
2. The position of planet gears 3, 3A on the braked sun gear 4, amplifies linear displacement of carrier 10 at axle 8 for an angular displacement of carrier 10. Because axle 8 projects over the braked sun gear 4, the radius of carrier 10 is larger at axle 8 by the radius of gear 3A from gear 4, which in translation of gear 3A diverts displacement of gear 3A over the translated surface of gear 4, in reaction to the rectilinear forces of the moment applied to the planet gear 3 circumference.
3. Amplifies torque or velocity in ratio of gear 2 to gear 2A radii from axle 7 (in this case 1-1) applied by gear 1A to gear 2. Thus placing velocity and torque of gear 1A on carrier 10 and making it a moving fulcrum. Therefore, when torque is applied by gear 2A to gear 3, these action occur simultaneously:
   a. The effort arm of the planet, radii of gear 3 plus gear 3A to axle 8 from gear 4 circumference is displaced in an arc and develops torque in ratio to load arm, radius of gear 3A from axle 8 to gear 4 circumference.
   b. Planet, gears 3, 3A and 8, rotate around their axis and displacing the planet over the circumference of gear 4 in ratio of load arm to the effort arm.
   c. Torque at axle 8 is displacing carrier 10. Carrier 10 is turning, translating the planet gears 3, 3A on axle 8 around gear 4, aligning axle 8 to be in line with the point of contact between gear 3A and gear 4 and the line of the radius of carrier 10 at that instant of time of displacement and carrying gear 2, 2A and axle 7 for that displacement thus maintaining separation between gear 2A and gear 3. Which means that this displacement resulting from the torque at axle 8 is a second external force acting on the center of the fulcrum, bearings 13 of axle 7, and in the direction of the effort of the planet, radii gears 3 plus 3A, adds to the angular displacement of gear 2A around its axis thus further displaces the effort arm of planet. Gears 3 and 3A, which results in proportional displacement of gear 3A over the circumference of gear 4 and compensating for the natural velocity reduction due to the ratio of the load arm to the effort arm of the planet, gears 3 and 3A on axle 8. Torque being an angular quantity did not gain or lose from that external force. Therefore the displacement of gear 3A around gear 4 is in direct ratio of gear 3 to gear 2A.
   d. This displacement also acts on center of gear 2. By changing separation in the direction and at the radius and axis of gear 1A to gear 1A, that rotates about a fixed axis. Thus paralleling the linear angular speed of gear 1A resulting in an increased engagement of time between teeth of gear 1A and gear 2. Which results in a reduction of angular speed of gear 2 proportional to this displacement in addition to the ratio of gear 2 to gear 1A. Or, gear 1A has to make one (1) revolution for one (1) revolution of carrier 10 in addition to the revolutions, as predeterment by the angular speed reduction ratio of the gear train.

Whereby the force applied to gear 3 by gear 2A of 1 lb, is 2 lb at axle 8 referenced to gear 4, developed by gears 3, 3A, for ½ revolution of carrier 10. Which equals ½ ft of translated linear displacement of planet gear 3A around gear 4, which also equals 1 ft linear displacement of carrier 10 developed by divergence of gear 3A at axle 8. Power realized at axle 8 P-2 is 2 lb×1 ft=2 ftlb/1Rev of gear 1A. Power at gear 5 is P2 in ratio of carrier 10 to gear 5 size.

4 lb×½ ft=2 ftlb/1Rev of gear 1A.

Figure 1:
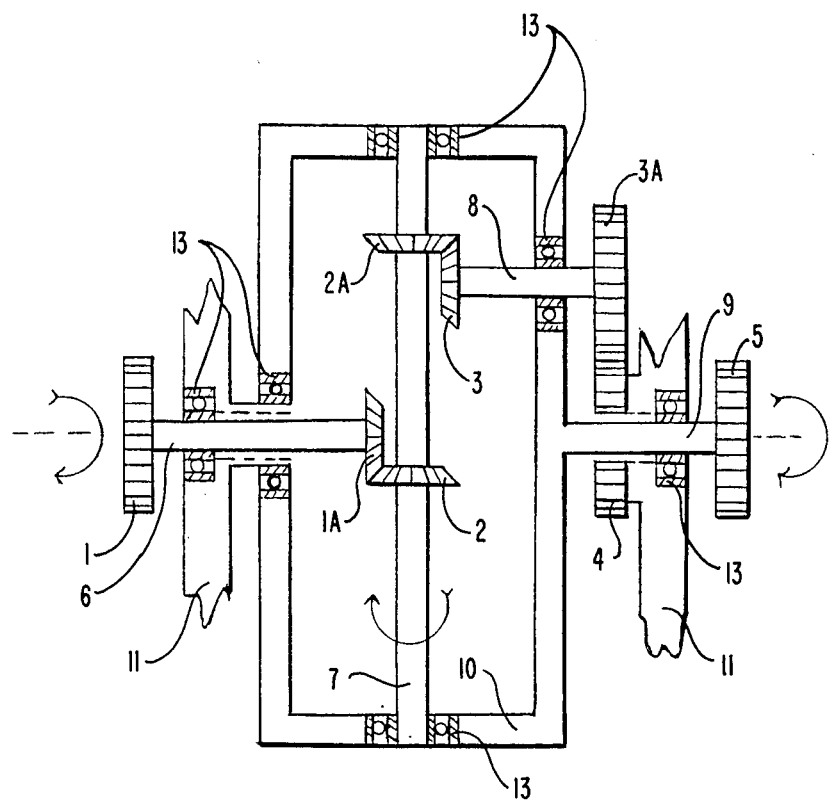

System shown in FIG. 1 further emphasizes the amplification of linear velocity of carrier 10. Where for an angular reduction of ½. The linear velocity is of carrier 10 is two (2) times that of gear 1A at axle 8 at the force one and one half (1½) times. See FIGS. 1, 2, 3 and 4.

Various modes of application conditions:
Gear 4 braked, input gear 5 (carrier 10), output gear 1.

Applying the same principals except in reverse order it is found that for 1 revolution of carrier 10, the angular speed is of gear 1 is inversely proportional. That is, it is in ratio between the driven and the driver gear, the planet gear 3A and reaction gear 4 plus 1 revolution of carrier 10. Because, the linear speed of carrier 10, at the radius of gear 1A, is added to the angular speed of gear 2, thus increasing the angular speed of gear 1A. Torque is also inversely proportional and is evident why. Therefore power at gear 1 is inversely proportional to power at gear 5. Thus a loss of power due to nonconservative forces in the system resulting from translation of planet gear 3, 3A, which inhibit the angular speed of gear 2A, that potentially is the ratio of effort, radius of gear 3A, to the load, radii of gears 3A plus 3, by which ratio torque incurred a loss.

Conditions:
Carrier 10 braked, input gear 1, output gear 5. Sun gear 4 nonrotatably affixed to shaft 9 rotatable.

Angular speed is inversely proportional to the reduction ratio. Thus a power ratio of one (1) to one (1).

Which proves that carrier 10 when forced into motion, exerts internal forces on planet gear 3, 3A by translating them around gear 4 in addition to the external forces, applied by the input gear.

Whereby overall, this system is in compliance with: Newton's 1st, 2nd, and 3rd Law. The laws of pure rotation of rigid bodies, the law mechanical advantage. The law of potential energy.

It is not in compliance with the 1st law of thermodynamics. But only, when the internal forces developed, are ignored.

The statements for angular speed and torque, have been tested in an arrangement shown in FIGS. 2, 3 and 4. Angular velocity was determined by count. Torque by a balancing method, placing a weight of known quantity, 50 grams, at the carrier shaft 9 at an arc equal to the radius of gear 5 and applying pressure with a pressure gauge at an arc equal to the radius of gear 1 at axle 6. When both were horizontal to the plane and balanced, reading of the pressure applied was read. In multiple tests, the readings were between 12 to 15 grams.

An experimental model of the arrangement as described, is available for examination and tests upon request.

What I claim is:

1. A ringgearless twin sun planetary power amplifier comprising a planetary gear arrangement in a housing and means within to mount: a centrally positioned braked reaction sun gear, concentric to the said reaction sun gear with a rigidly affixed driving gear, a rotatable input axle, extending outside the said housing providing means for driving connection with a power source, opposite and concentric to the said input axle, a carrier with a rigidly affixed carrier shaft, passing through and journaled from the said reaction sun gear and housing providing means of connection with a load, on the said carrier providing means parallel to the axis of rotation of the said carrier with a rigidly affixed driven and driving planet gear in a location where the said driving planet gear meshes with the said reaction sun gear, a rotatable planet axle, instituting the driving connection with the said carrier, a rotatable idler axle with a ridigly affixed driven idler gear meshing with the driving gear on the said input axle and a rigidly affixed driving idler gear meshing with the driven gear on the said planet axle is mounted on the said carrier providing means in a position that institutes the said meshing of gears thereof, and all the said meshed gears constitute a gear train, which reduces the angular speed of the said carrier in respect to the input speed as determined by a speed reduction ratio factor, that is a sum of one revolution of the said carrier plus the product of ratios between the number of teeth of the meshing pairs of gears, defining the centers as the axes of their rotations.

2. Power amplifier as defined in claim 1 wherein the input torque in respect to the carrier output torque is amplified by an amplification factor, determined by the product of ratios between the sizes of the driven and driving radii from their particular axes of rotations of the said meshed pairs in the said gear train and the said carrier, specifically, the primary momentary axis of rotation of the said planet axle gears driven radius, that imposes the second axis of rotation around the center and parallel to the axis of the said carrier, is defined around the point contact with the said reaction sun gear and the size of the said driven radius thereof, is defined by the sum of the radii of the said planet axle driven and driving gear, the size of the driven radius of the said carrier, is defined by the sum of the radii of the said driving planet axle gear and the said braked reaction sun gear and the axis of rotation thereof, is defined at the center of the said braked reaction gear, the said defined sizes of the radii from their particular axes define the said torque amplification factor as larger, than the said speed reduction ratio factor.

3. Power amplifier as defined in claim 2 wherein the said gear train having a predetermined said speed reduction ratio factor renders a larger said torque amplification factor, defines an amplified power output at the said carrier, in respect to the input power.

* * * * *